US010704374B2

(12) United States Patent
Martin

(10) Patent No.: US 10,704,374 B2
(45) Date of Patent: *Jul. 7, 2020

(54) SYSTEM AND METHOD FOR PROCESSING FLOWBACK FLUID

(71) Applicant: RJ Enterprises, Inc., Spruce Grove, AB (CA)

(72) Inventor: Kristian Martin, Prince Rupert (CA)

(73) Assignee: RJ Enterprises, Inc., Spruce Grove, Alberta (CA)

( * ) Notice: Subject to any disclaimer, the term of this patent is extended or adjusted under 35 U.S.C. 154(b) by 235 days.

This patent is subject to a terminal disclaimer.

(21) Appl. No.: 15/613,193

(22) Filed: Jun. 3, 2017

(65) Prior Publication Data

US 2017/0350227 A1 Dec. 7, 2017

Related U.S. Application Data

(60) Provisional application No. 62/345,589, filed on Jun. 3, 2016.

(51) Int. Cl.
| | | |
|---|---|---|
| *B01D 21/00* | (2006.01) | |
| *B01D 19/00* | (2006.01) | |
| *E21B 43/34* | (2006.01) | |
| *E21B 43/26* | (2006.01) | |
| *B01D 21/24* | (2006.01) | |
| *B04C 5/28* | (2006.01) | |

(52) U.S. Cl.
CPC .......... *E21B 43/34* (2013.01); *B01D 19/0057* (2013.01); *B01D 21/0042* (2013.01); *B01D 21/0048* (2013.01); *B01D 21/245* (2013.01); *B04C 5/28* (2013.01); *E21B 43/26* (2013.01)

(58) Field of Classification Search
CPC .......... E21B 43/34; E21B 43/26; B04C 5/28; B01D 19/00; B01D 21/00; B01D 21/24
See application file for complete search history.

(56) References Cited

U.S. PATENT DOCUMENTS

| 2,243,395 A | 5/1941 | Scholtz |
| 6,119,779 A | 9/2000 | Gipson et al. |

(Continued)

FOREIGN PATENT DOCUMENTS

| CN | 104645701 | 5/2015 | | |
| GB | 2348896 A | * 10/2000 | ........... | E21B 21/062 |
| WO | WO-2015183434 A2 | * 12/2015 | ........... | E21B 41/005 |

*Primary Examiner* — Youngsul Jeong

(74) *Attorney, Agent, or Firm* — Craft Chu PLLC; Andrew W. Chu

(57) ABSTRACT

The system and method for processing flowback fluid include a plurality of wellheads producing flowback fluid flows, a plurality of first stage separators corresponding to at least one wellhead of an installation with multiple wellheads and multiple flowback fluid flows, a plurality of metering devices corresponding to each first stage separator, and a second stage separator in fluid connection with the metering devices and the first stage separators. Flowback fluid flows pass from the wellhead to the first stage separators for initial separation of a gas phase, through the metering devices for determination of production levels for each wellhead, and into the second stage separator for an additional gas phase separation. The storage volumes of the first and second stage separators control the retention time in the second stage separator for safe and efficient operation.

18 Claims, 12 Drawing Sheets

(56) References Cited

U.S. PATENT DOCUMENTS

| | | |
|---|---|---|
| 6,730,236 B2 * | 5/2004 | Kouba ............... B01D 17/0208 210/806 |
| 6,875,728 B2 | 4/2005 | Gupta et al. |
| 7,128,169 B2 | 10/2006 | Massetti et al. |
| 7,635,430 B2 | 12/2009 | Mildren et al. |
| 8,074,738 B2 | 12/2011 | McDonald et al. |
| 8,857,519 B2 | 10/2014 | Hale |
| 2004/0217050 A1 | 11/2004 | Schmidt et al. |

* cited by examiner

SYSTEM AND METHOD FOR PROCESSING FLOWBACK FLUID

CROSS-REFERENCE TO RELATED APPLICATIONS

The present invention claims priority under 35 USC Section 119 (e) claiming priority to a provisional patent application, U.S. Provisional Patent Application Ser. No. 62/345,589, entitled "SYSTEM AND METHOD FOR PROCESSING FLOWBACK FLUID", filed on 3 Jun. 2016.

See also Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to hydraulic fracturing. In particular, the present invention relates to a system and method for processing flowback fluid or flowback water from a wellhead. More particularly, the present invention relates to a system and method to selectively sever the multiple processes of a conventional horizontal separator into isolated stages with corresponding components. Even more particularly, the system and method provides separate metering for each wellhead of a system with multiple wellheads and multiple flow streams.

2. Description of Related Art Including Information Disclosed Under 37 CFR 1.97 and 37 CFR 1.98

Shale gas production relies on hydraulic fracturing as a completion process to release natural gas from a rock formation. Hydraulic fracturing includes injecting a frac fluid of water, chemical additives, and proppant (usually sand) into a well at high pressures. The frac fluid creates small fractures in the rock formation, and the proppant wedges into the fractures. Any gas trapped in the rock formation can now escape and be recovered at the wellhead.

The used frac fluid is also recovered at the wellhead as flowback fluid or flowback water. This flowback fluid includes the liquid hydrocarbons, dissolved gases, unused sand, soil, remnants of the chemical additives and water. Flowback fluid must be processed for proper disposal or for re-use in another fracturing process.

Horizontal separators are the known prior art. The flowback fluid flows from at least one wellhead of multiple wellheads to a single horizontal separator comprised of a pressure vessel and several outlets. The phases and components of the flowback fluid separate in the horizontal separator as the flowback fluid settles. The amount of time required for sufficient process separation is known as retention time. Larger vessels have more area for the separation, and consequently less retention time. In the horizontal separator, gases release to the top, oil rises above water, and denser sand falls to the bottom. Outlets at the top can remove or vent the gas phase. Usually, the sand settles on the bottom and can fill the vessel, such that most horizontal separators for flowback fluid are very large. The sand-fill or accumulation of sand in the horizontal separator decreases efficiency, such that retention time is increased. To avoid sand-fill, solids are sometimes removed before the horizontal separators, such as a separate solids separation device, a hydro cyclone, or other means upstream from the horizontal separator. In this position for flowback fluid, the temperature and pressure for solids separation systems are higher, and more likely to be damaged. The wear of abrasive sand upstream can shorten the working life of upstream solid separation devices for flowback fluid. Various additional chemical agents can also be added to further treat the flowback fluid. The chemical agents can affect the release of dissolved gases and separate other chemical components in the flowback fluid for easier disposal or recycling. Eventually, gas is vented, sand is collected, and the liquid phase (water with additives) is diverted to storage. Multiple processes are integrated into the horizontal separator. The temperature and pressure conditions, the retention time or duration of containment in the horizontal separator, and the storage capacity of the horizontal separator are limitations on the functionality of the horizontal separator. Additionally, multiple wellheads are diverted to a single large vessel such that individual metering of a wellhead is not possible.

Multiple stage processing is generally known in oil and gas production. For example, the production fluid of a conventional well (not a shale gas well) can be processed in multiple steps with an initial separation step. The solids, such as drill cuttings, are first separated as the easier phase to remove from the production fluid. The solids are removed first, and then the remaining fluid is processed for the hydrocarbon collection. CN 104645701, a Chinese patent granted to Cao, et al. on 27 May 2015 discloses a system with a cyclone separator first. Solids are removed first, not the gas. Similarly, U.S. Pat. No. 6,875,728, issued to Gupta, et al. on 5 Apr. 2005 shows a cyclone separator in the first part of a separation process with a filtering means before a mixing means. U.S. Pat. No. 7,128,169, issued to Massetti, et al. on 31 Oct. 2006 is another example with drilling cuttings to be separated.

A gas phase can also be the first separated phase from production fluid. U.S. Pat. No. 6,730,236, issued to Kouba, on 4 May 2004 discloses that a production fluid is processed by separating a gas phase with a gas liquid cylindrical cyclone (GLCC) separator. The remaining fluid is sent to a liquid separator for a conventional phase separation. Dissolved gases are released in the later stages for the single corresponding wellhead. The metering is limited to the single wellhead. Thus, a cyclone separator is known to be an initial component of a system to initially separate solids (U.S. Pat. No. 7,128,169) or gas (U.S. Pat. No. 6,730,236).

U.S. Pat. No. 8,857,519, issued to Hale, on 14 Oct. 2014, discloses another GLCC separator in a different multiple stage process for a conventional well. The known functionality of the GLCC separator to release gas is used in series with a regular horizontal separator. Further dissolved gas and phase separation are set for the later processing. The disclosures of production fluids from conventional wells and subsea wells do not specifically mention flowback fluid from hydraulic fracturing in shale production. The presence of a solid, the sand or proppant, is not a major consideration of the multiphase fluids of oil and water in the prior art of conventional wells.

In shale production, processing flowback fluids with a cyclone separator is directly addressed in U.S. Patent Publication No. 2004/0217050, published for Schmidt, et al. on 4 Nov. 2004. However, the cyclone separator is not used in initial gas phase separation. The known cyclone separator in flowback fluid processing of shale production is incorporated as a solids separator upstream from the horizontal separator.

Specialized components for solid phase separation in a system for production fluid processing are also known. U.S. Pat. Nos. 6,875,728 and 7,128,169 have been previously discussed as removing solids from production fluid, and these systems disclose conventional tank and filter components. The horizontal separation tank in shale production relies on phase separation by density and weight in a storage portion of the tank. Conical shapes have been disclosed in phase separation devices, including U.S. Pat. No. 7,635,430, issued to Mildren et al. on 22 Dec. 2009, for a hydrocyclone. FIG. 3 of U.S. Pat. No. 8,074,738, issued to McDonald, et al. on 13 Dec. 2011 shows two cones, one as a feed cone to enter a tank and another as outlet to exit the tank. There are no adaptations of cones in flowback fluid processing systems for shale production. There is no disclosure of specialized cones in a sequence of flowback fluid processing.

It is an object of the present invention to provide an improved system and method for processing flowback fluid.

It is an object of the present invention to provide a multiple stage process in multiple components for recovering gas and separating other phases from hydraulic fracturing.

It is another object of the present invention to selectively sever the multiple processes of a conventional horizontal separator into isolated stages with corresponding components.

It is still another object of the present invention to set independent temperature, pressure, flow rate, and retention time conditions in the corresponding components, according to the associated isolated stage.

It is an object of the present invention to provide a system and method for metering each wellhead of a multiple wellhead installation.

It is another object of the present invention to provide a system and method for metering each wellhead with multiple flowback fluid flows from a multiple wellhead installation.

It is an object of the present invention to provide a system and method for distributing flowback fluids under safe and controlled conditions.

It is another object of the present invention to provide a system and method with a manifold skid to distribute flowback fluids as diversion flowback fluids.

It is still another object of the present invention to provide a system and method with a manifold skid to designate a single wellhead for a single diversion outlet to a single first stage separator for evaluating the single wellhead.

It is still another object of the present invention to provide a system and method with a manifold skid to alternate designation of the single wellhead through all of the wellheads so that all wellheads are evaluate concurrent with processing flowback fluids from remaining wellheads.

It is an object of the present invention to provide an improved system and the method for separating the solid phase from the flowback fluid.

It is another object of the present invention to provide a solids separator tank without the storage capacity limitation of a conventional horizontal separator.

It is still another object of the present invention to provide an active solids separator tank within the volume of the solids separator tank.

It is still another object of the present invention to provide a cone assembly in the second stage separator to actively settle solids for removal from the second stage separator.

These and other objectives and advantages of the present invention will become apparent from a reading of the attached specification.

BRIEF SUMMARY OF THE INVENTION

Embodiments of the system for processing flowback fluid include a plurality of wellheads, a plurality of first stage separators, a plurality of metering devices, and a second stage separator. Each wellhead produces a flowback fluid flow. Each wellhead may be a single wellhead or one wellhead in a group of wellheads. The system addresses multiple wellheads with corresponding flowback fluid flows, and there is a first stage separator for each wellhead and corresponding flowback fluid flow. Each first stage separator connects to a respective wellhead, and each metering device connects to a respective first stage separator so that the metering device measures corresponding flowback fluid flow from a particular wellhead.

In other embodiments, there is a manifold skid between the wellheads and the first stage separators. The manifold skid distributes the flowback fluids through a diversion header with diversion outlets to the first stage separators. Each diversion outlet corresponds to a first stage separator, instead of each wellhead corresponding to a first stage separator. The diversion header can designate a single wellhead to a single diversion outlet and corresponding single first stage separator, so that individual wellheads can still be measured and evaluated.

Each first stage separator is comprised of a first stage tank with a first stage inlet and a plurality of first stage outlets. The first stage separator can be a gas liquid cylindrical cyclone (GLCC) separator. The first stage separators split incoming flowback fluid or diversion flowback fluid into a first release gas phase and a first de-gassed flowback fluid. The first release gas phase can be collected as the valuable commodity from the wellhead or stored for disposal at a later time, depending upon the quality of the first release gas phase. The first de-gassed flowback fluid passes to the second stage separator for additional processing.

There is a second release gas phase from the first de-gassed flowback fluid within the second stage separator. The first stage volume is less than the second stage volume, and the first stage gas capacity is held constant, while the second stage gas capacity decreases. The combination of the first and second release gas phases and the relationships between volume and gas storage capacity of the second stage separator set the retention time in the second stage tank of the second stage separator. This retention time allows for the smaller second stage separator and the even smaller first stage separator to replace the prior art horizontal separator. The steps of the all-in-one horizontal separator are replaced by smaller components in a particular sequence to release the different phases of multiphase fluid more efficiently.

In some embodiments, the second stage separator includes a means for solids separation so as to control the amount of decreasing the second stage gas capacity. When the solids are actively removed, the second stage gas capacity can be set a predetermined amount of decreasing. The additional control improves safety and efficiency by reducing overflow risks and affecting retention time. In the present invention, a cone assembly separates the solids from the first de-gassed flowback fluid entering the second stage tank. Instead of relying on gravity and weight, the cone surfaces more quickly isolates the solids that can be removed at the bottom of the cone, while the solids separation can continue at the top of the cone.

Embodiments of the present invention further include means for gas phase separation, such as demisters and mesh, in each of the first stage separator and second stage separator. The system can further include components for additional processing. The first release gas phase and second release gas phase can be collected for sale as a commodity or disposed, depending upon quality of the gas. Other lines and storage vessels can be connected to the first and second stage separators for this processing. For disposing the gas phase, there can be connections to vents or even towers for burning off the gas phase. In the embodiments with the means for solids separation in the second stage separator, there can be means for solids removal, such as another line or storage vessel to physically move and separate these solids from the second stage tank. The liquid phase flowback fluid flow from the second stage separator can be connected to a means for fluid storage, such as another storage vessel or settling tank. These leftover materials from the original flowback fluids can be stored for later processing or disposed of in a safe manner.

DETAILED DESCRIPTION OF THE INVENTION

Figure 1:
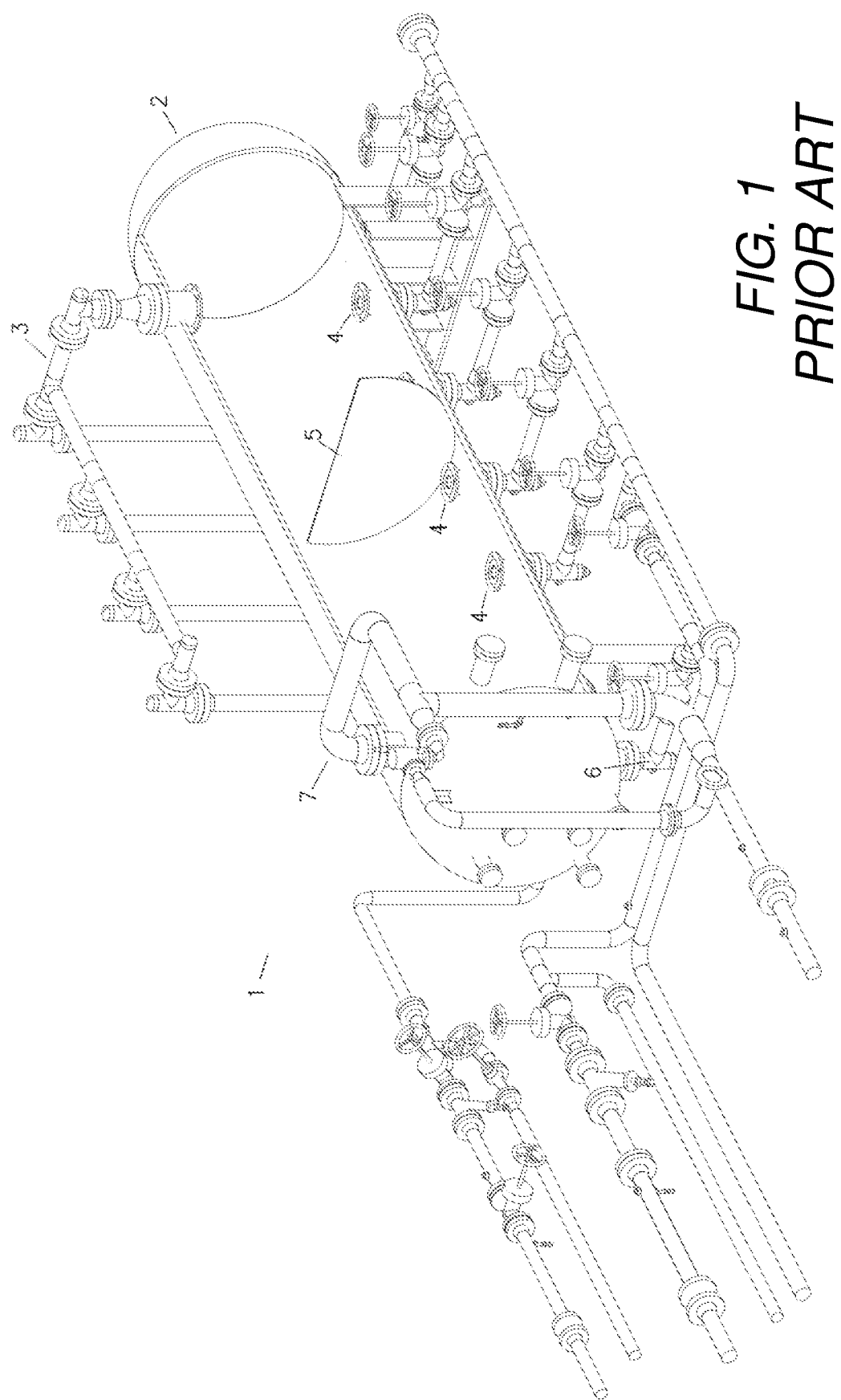
FIG. 1 shows a schematic view of the horizontal separator of the prior art.

The prior art horizontal separator 1 is shown in FIG. 1. The single vessel 2 has a group inlet 3 for the flowback fluids from several wellheads, as shown in the multiple connections to the group inlet 3. The individual contribution and quality of a particular wellhead is unknown, and the mixture of flowback fluids are treated as a single flow. The single vessel 2 relies on gravity and time to separate the different phases in the single flow of flowback fluids. There are drains 4 on the bottom of the vessel 2 to remove solids, such as sand and other heavy materials. The liquid phase above the solid phase can be split into oil and water with the oil suspended in a layer above the water. The horizontal separator 1 in FIG. 1 has a Weir plate 5 to separate the oil. As one side of the Weir plate 5 fills with liquid, the oil rises to the top. Thus, only the oil layer will spill over the Weir plate 5 and into the opposite side. From this opposite side, there is a liquid outlet 6 for the oil and any other liquid to be removed and a gas outlet 7 near the top of the vessel 2 for the gas phase to be removed.

In this prior art system, the flowback fluids must remain in the vessel 1 for sufficient time to settle. The layers of heavy sand, water, oil, and gas require time to form. Additionally, gas mixed into the multiphase fluid must have time to bubble and escape. The solids need time to sink to the bottom. The oil needs time to separate from the water, and the prior art Weir plates reduce the available volume for the liquid phase separation. FIG. 1 shows only half of the vessel 2 available for the liquid phase to separate into layers. The duration of stay by the flowback fluid in the horizontal separator 1 can be referred to as retention time. Thus, the storage capacity of vessel 2 determines effectiveness of the horizontal separator 1. Very large vessels 2 with very large storage capacities are required for processing flowback fluids. Additionally, the storage capacity is constantly decreasing as the amount of solids build in the bottom of the vessel 2. The drains 4 are no free flowing because the flow is mostly solids, and any clog or obstruction will greatly affect the removal of solids. The prior art horizontal separators 1 are prone to clogs and decreasing storage capacity, furthering the need for larger and larger vessels 2.

FIGS. 2, 3A, 3B, 3C and 3D show the system 10 and method for processing flowback fluid, according to the present invention. There is a plurality of wellheads 12, and each wellhead 12 produces a flowback fluid flow 20.1. For one system 10, a group of wellheads 12 can be designated for one system 10 or all wellheads of a site can be associated to the system. Each wellhead 12 can be connected to a choke manifold 14. The choke manifold 14 controls the flowback fluid flow 20.1 as a safety measure.

Figure 2:
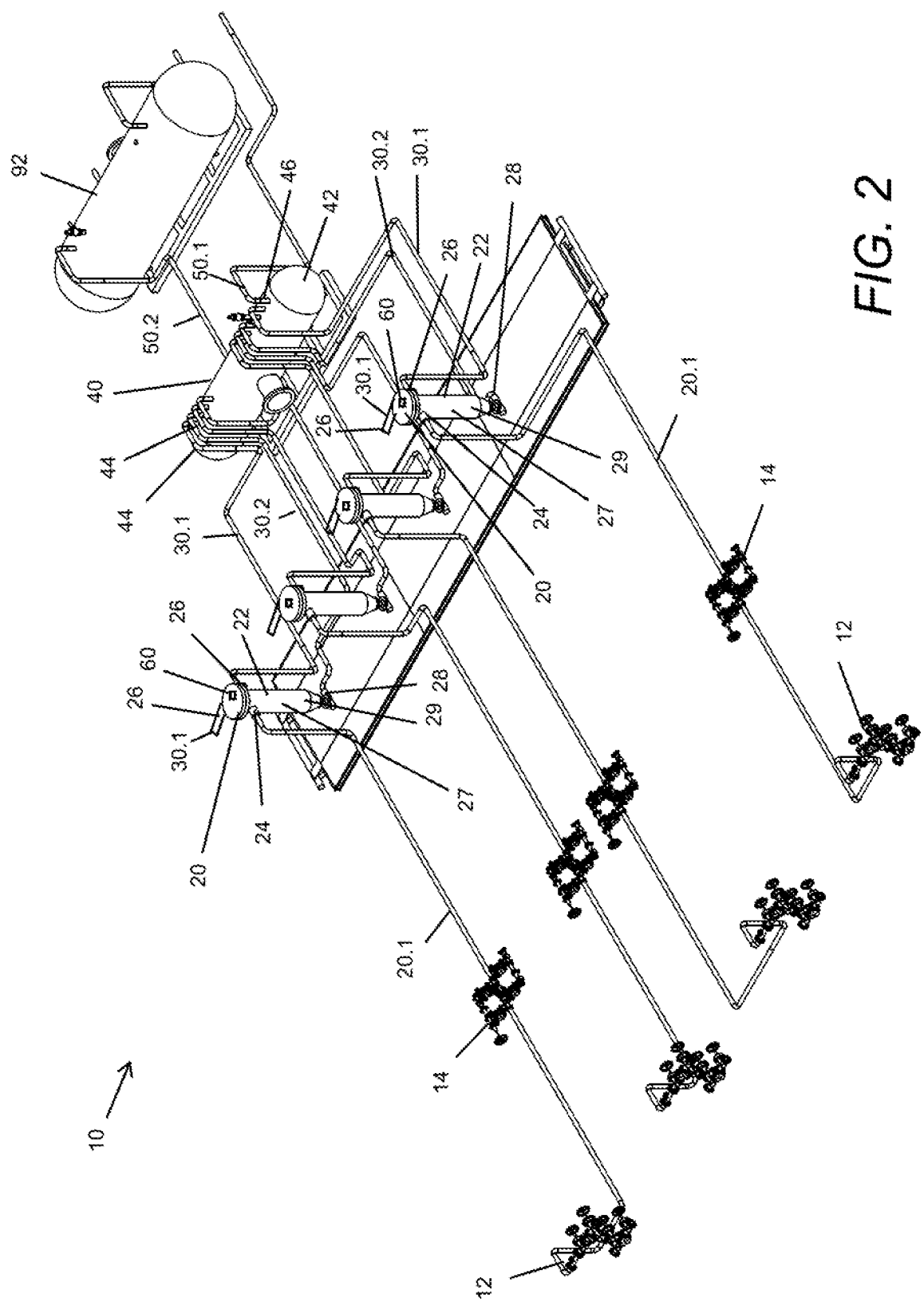
FIG. 2 shows a schematic view of the system and method for flowback fluid, according to embodiments of the present invention.

The system 10 includes a plurality of first stage separators 20, and there is one first stage separator 20 for each wellhead 12 and choke manifold 14. Each first stage separator 20 is in fluid connection to a respective wellhead 12. FIGS. 2, 3B and 3C show each first stage separator being comprised of a first stage tank 22 with a first stage inlet 24, a primary first stage outlet 26, and a secondary first stage outlet 28. In some embodiments, the first stage separator 20 is a gas liquid cylindrical cyclone (GLCC) separator. The first stage inlet 24 passes flowback fluid 20.1 into the first stage tank 22. The first stage tank 22 has a first stage volume 27 with a first stage gas capacity 29. The flowback fluid 20.1 separates in the first stage tank 22 with a first release gas phase 30.1 passing through the primary first stage outlet 26. This first release gas phase 30.1 separates from the first de-gassed flowback fluid flow 30.2. The first de-gassed flowback fluid flow 30.2 passes through the secondary first stage outlet 28. The first stage capacity 29 is held constant when the first release gas phase 30.1 passes through the primary first stage outlet 26 and when the first de-gassed flowback fluid flow 30.2 passes through the secondary first stage outlet 28. Unlike the prior art, the first stage capacity 29 does not decrease because solids are removed.

Figure 6:
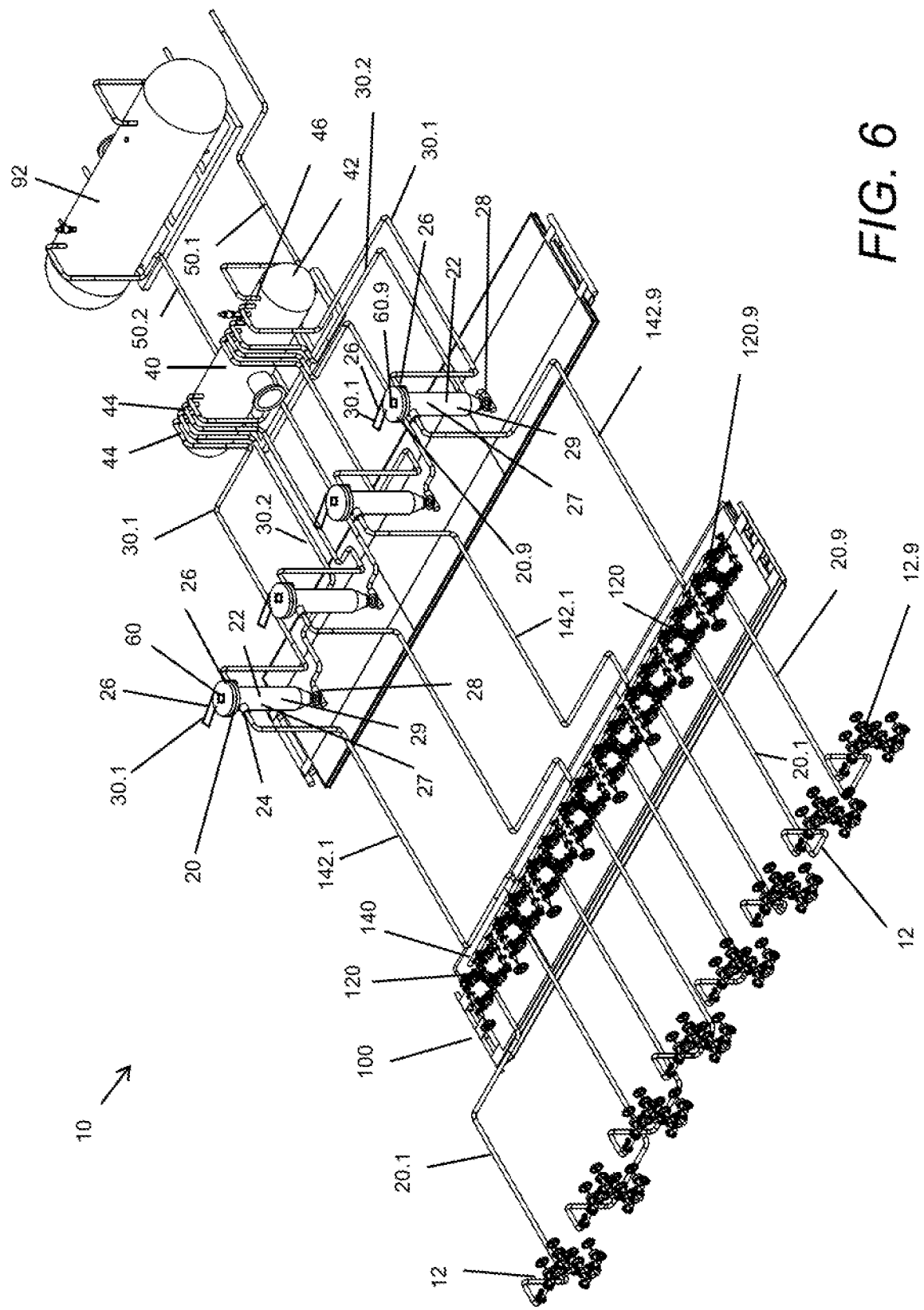
FIG. 6 shows a schematic view of an embodiment of the system and method for flowback fluid with the manifold skid and diversion header, according to the present invention.
Figure 7A:
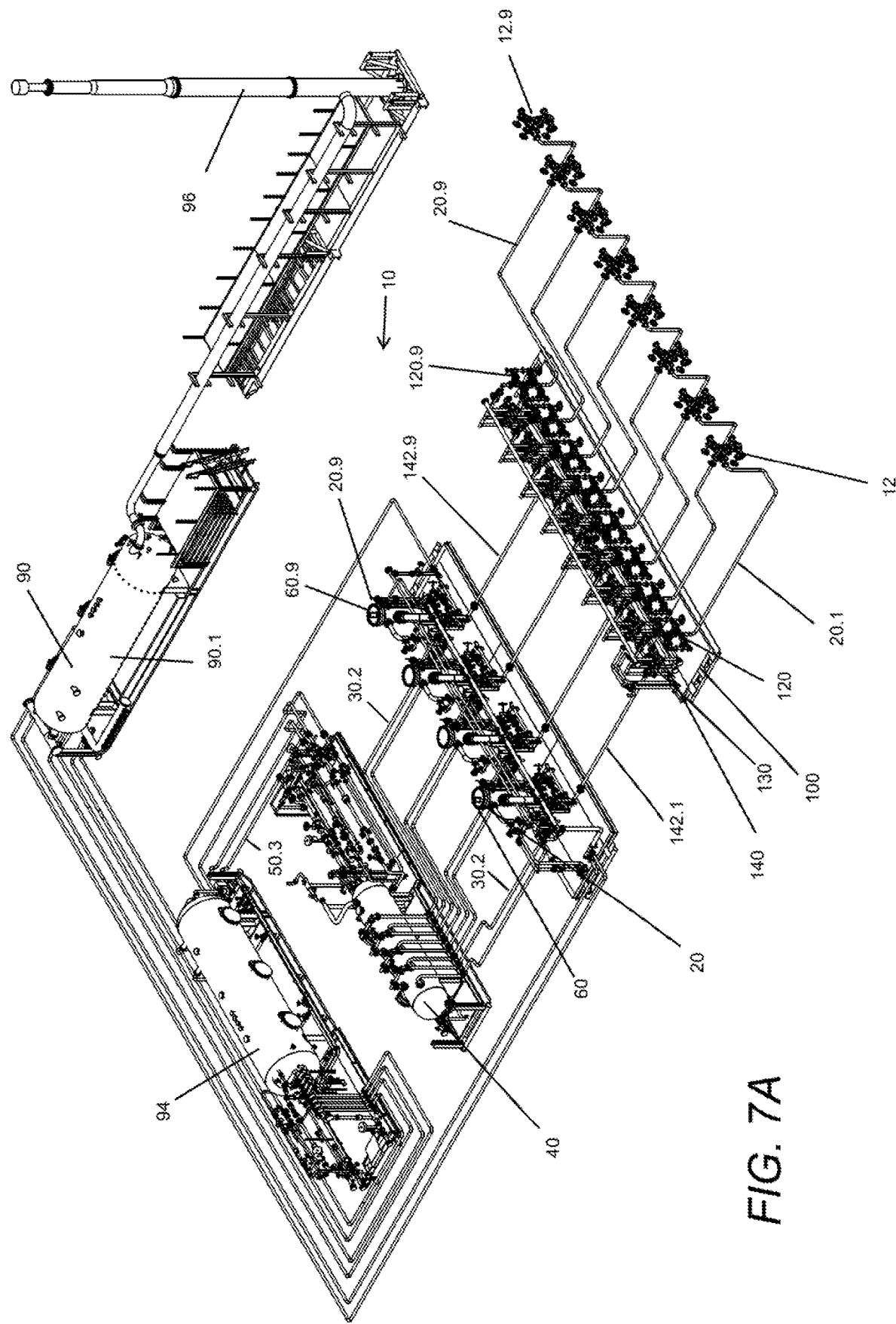
FIG. 7A shows a schematic view of another embodiment of the system and method with the manifold skid and diversion header, according to the present invention.
Figure 7B:
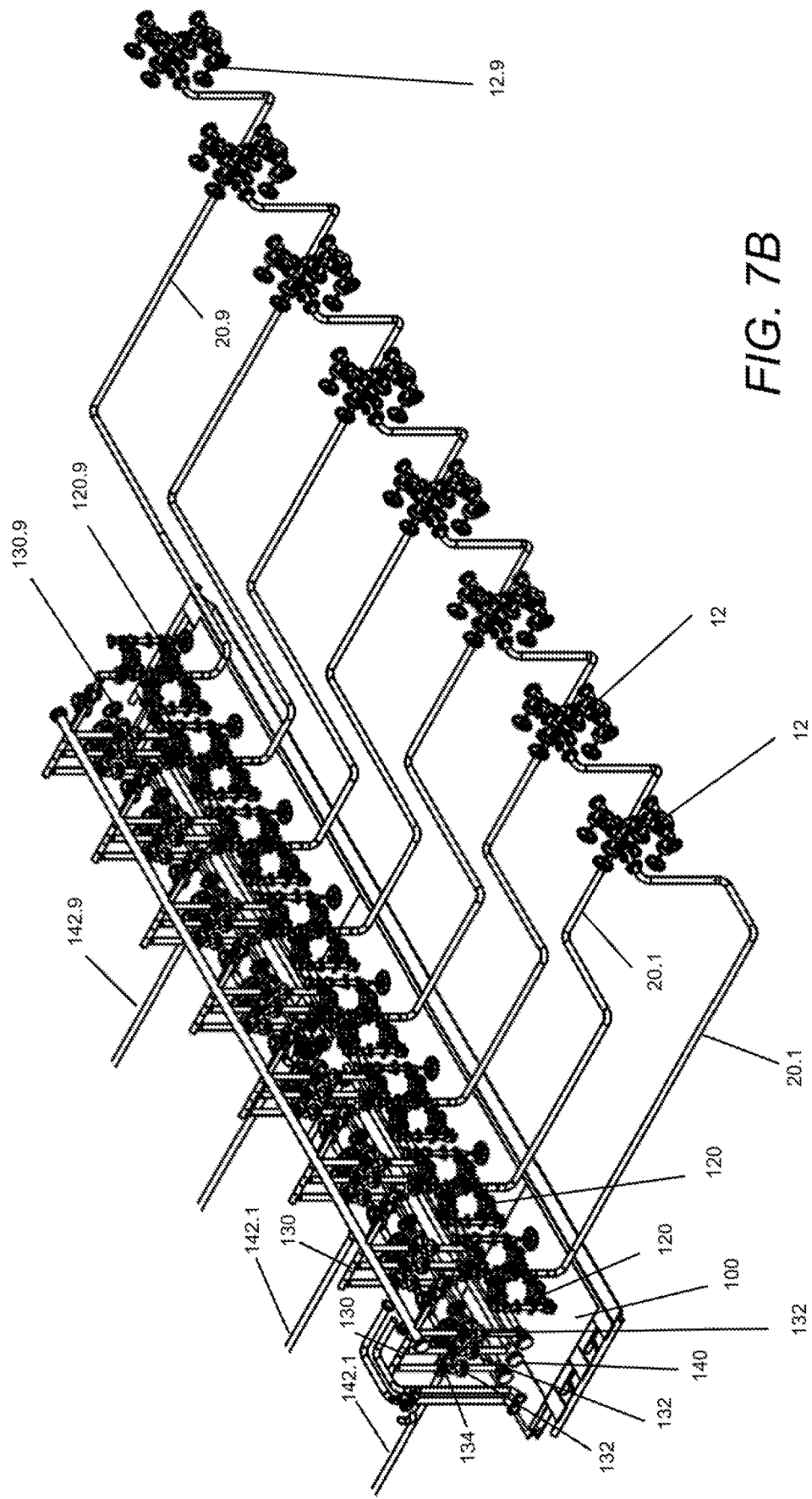
FIG. 7B is an isolated schematic view of the wellheads and manifold skid with diversion header, according to the embodiment in FIG. 7A.
Figure 7C:
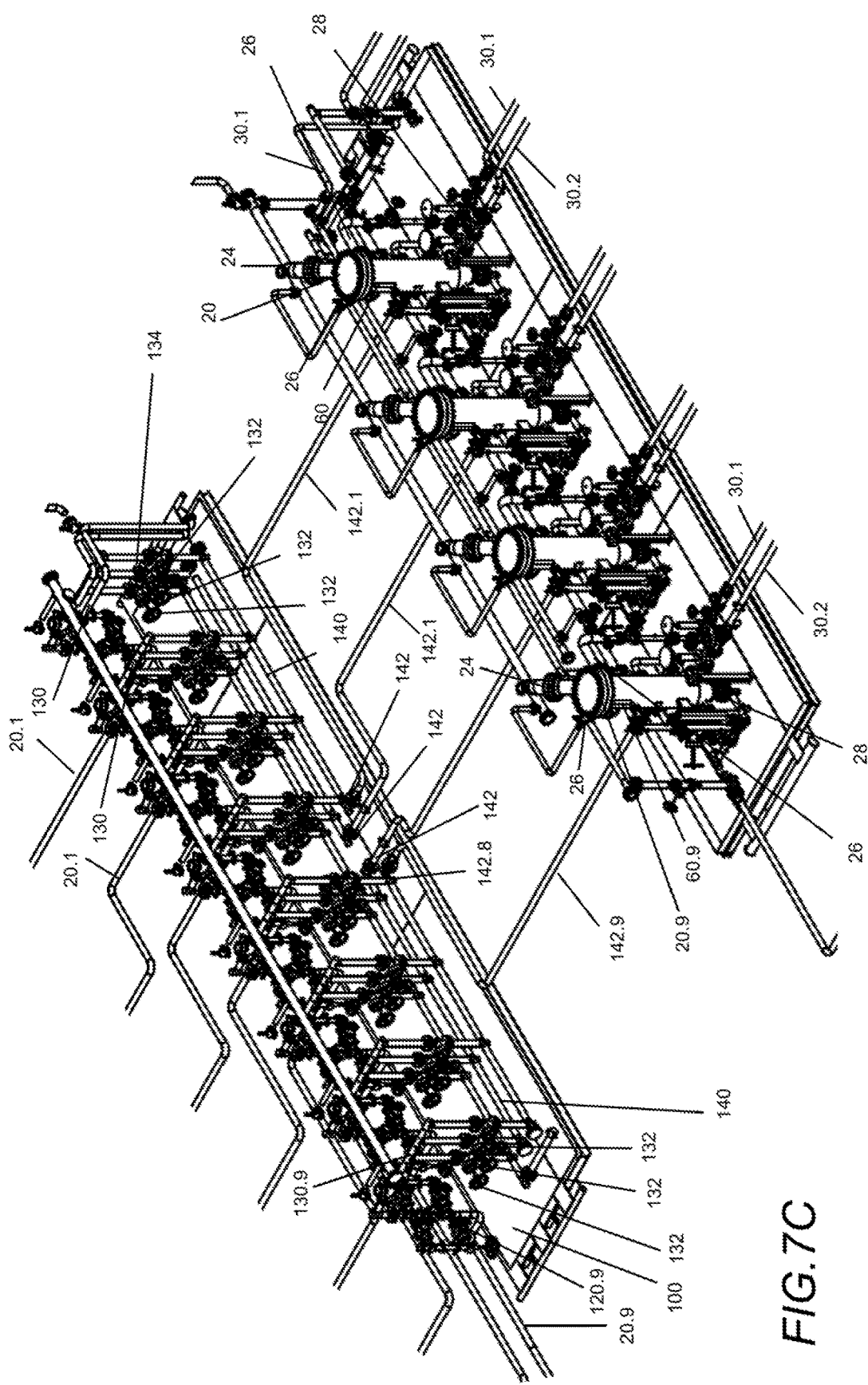
FIG. 7C is an isolated schematic view of the manifold skid with diversion header and first stage separators, according to the embodiment in FIG. 7A.

FIGS. 6, 7A, 7B, and 7C show an alternate embodiment with a manifold skid 100 between the wellheads 12 and the first stage separators 20. The system 10 includes a manifold skid 100 being comprised of a plurality of a choke manifolds 120, a controller 130, and a diversion header 140. Each choke manifold 120 is in fluid connection to a respective wellhead 12, and there is one choke manifold 120 for each wellhead 12 in FIG. 7B. Each choke manifold 120 is also in fluid connection with the diversion header 140. FIG. 7C shows the diversion header 140 having a plurality of diversion outlets 142. In this embodiment of FIGS. 6, 7A, 7B, and 7C, the flowback fluid 20.1 of each wellhead 12 passes through a respective choke manifold 120 to the diversion header 140. The controller 130 regulates the diversion outlets 142 of the diversion header 140 to produce a diversion flowback fluid flow 142.1 from each diversion outlet 142. The controller 130 is in communication with the choke manifolds 120, the diversion header 140 and the diversion outlets 142. In FIGS. 6, 7A, 7B, and 7C, the plurality of first stage separators 20 are in fluid connection to a respective diversion outlet 142 instead of a respective wellhead 12. In the system 10, the number of wellheads 12 matches the number of choke manifolds 120, and the number diversion outlets 142 matches the number of first stage separators 20.

Embodiments of both FIGS. 2, 3A, 3B, 3C and 3D and FIGS. 6, 7A, 7B, and 7C, each show a first stage separator 20 being comprised of a first stage tank 22 with a first stage inlet 24, a primary first stage outlet 26, and a secondary first stage outlet 28. In some embodiments, the first stage separator 20 is a gas liquid cylindrical cyclone (GLCC) separator. The first stage inlet 24 passes flowback fluid 20.1 into the first stage tank 22 in FIG. 3B, and the first stage inlet 24 passes diversion flowback fluid 142.1 into the first stage tank in FIG. 7C. The first stage tank 22 has a first stage volume 27 with a first stage gas capacity 29. The flowback fluid 20.1 or diversion flowback fluid 142.1 separates in the first stage tank 22 with a first release gas phase 30.1 passing through the primary first stage outlet 26. This first release gas phase 30.1 separates from a first de-gassed flowback fluid flow 30.2. The first de-gassed flowback fluid flow 30.2 passes through the secondary first stage outlet 28. The first stage capacity 29 is held constant when the first release gas phase 30.1 passes through the primary first stage outlet 26 and when the first de-gassed flowback fluid flow 30.2 passes through the secondary first stage outlet 28. Unlike the prior art, the first stage capacity 29 does not decrease because solids are removed.

The first release gas phase 30.1 can be collected. This gas phase may be suitable for the sales line, as the commodity produced from the wellhead. This gas phase may also be stored or disposed, depending upon quality and other factors. The first release gas phase 30.1 can also be passed to the second stage separator 40 through another primary first stage outlet as shown in FIGS. 2, 3C, 6 and 7C. The first release gas phase 30.1 affects efficiency of the second stage separator 40 with this gas phase already separated from the flowback fluid flow 20.1. The first release gas phase 30.1 may more easily pass through the second stage separator 40 through the primary second stage outlet 46 as the second release gas phase 50.1 from the second stage separator 40. In some embodiments, each first stage separator 20 can include a first means for gas phase separation 34 between a respective first stage tank 22 and a respective primary first stage outlet 26. The means for gas phase separation include demisters, mesh, fiber, and cyclones, which allow gas to pass with lesser moisture or fewer particles. The first release gas phase 30.1 can be monitored for temperature, pressure, flow rate and purity so as to determine usefulness and value.

When the first release gas phase 30.1 is not very high quality or when there is an emergency outage, the primary first stage outlet 26 can be closed. Thus, the secondary first stage outlet 28 and the respective second stage inlet 44 form a bypass line. The flowback fluid 20.1 of FIGS. 2, 3A, 3B, 3C and 3D can pass through the first stage separator 20 directly to the second stage tank 42. Otherwise, there is a split of the first release gas phase 30.1 and the first de-gassed flowback fluid flow 30.2. There is no need for a bypass line in the embodiment of FIGS. 6, 7A, 7B, and 7C with the manifold skid 100 because the diversion outlets 142 and the diversion flowback fluid flows 142.1 are regulated by the controller 130. A problematic wellhead 12 with a problematic flowback fluid 20.1 to the diversion header 140 can already be mixed and managed.

The first de-gassed flowback fluid flow 30.2 proceeds through the system 10 to a second stage separator 40 in fluid connection with the plurality of first stage separators 20. Each of the first de-gassed flowback fluids 30.2 from each wellhead 12 (FIGS. 2 and 3B) or from each diversion outlet 142 (FIGS. 6 and 7C) are now mixed together in the second stage separator 40 as shown in FIGS. 3C and 7A, respectively for the different embodiments. The second stage separator 40 is comprised of a second stage tank 42 with a plurality of second stage inlets 44, a plurality of primary second stage outlets 46, and a plurality of secondary stage outlets 48.

Figure 3A:
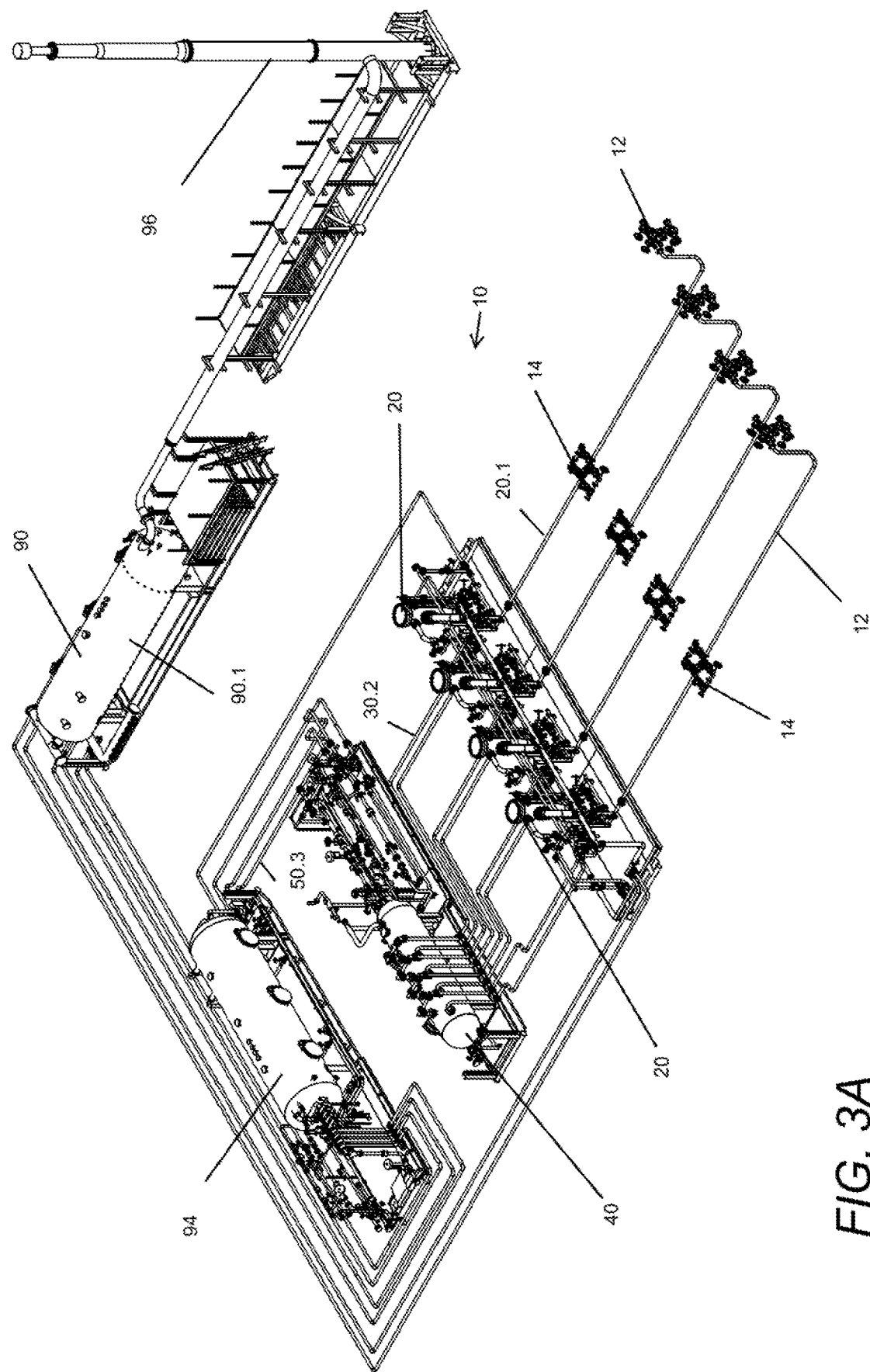
FIG. 3A shows a schematic view of another embodiment of the system and method, according to the present invention.
Figure 3B:
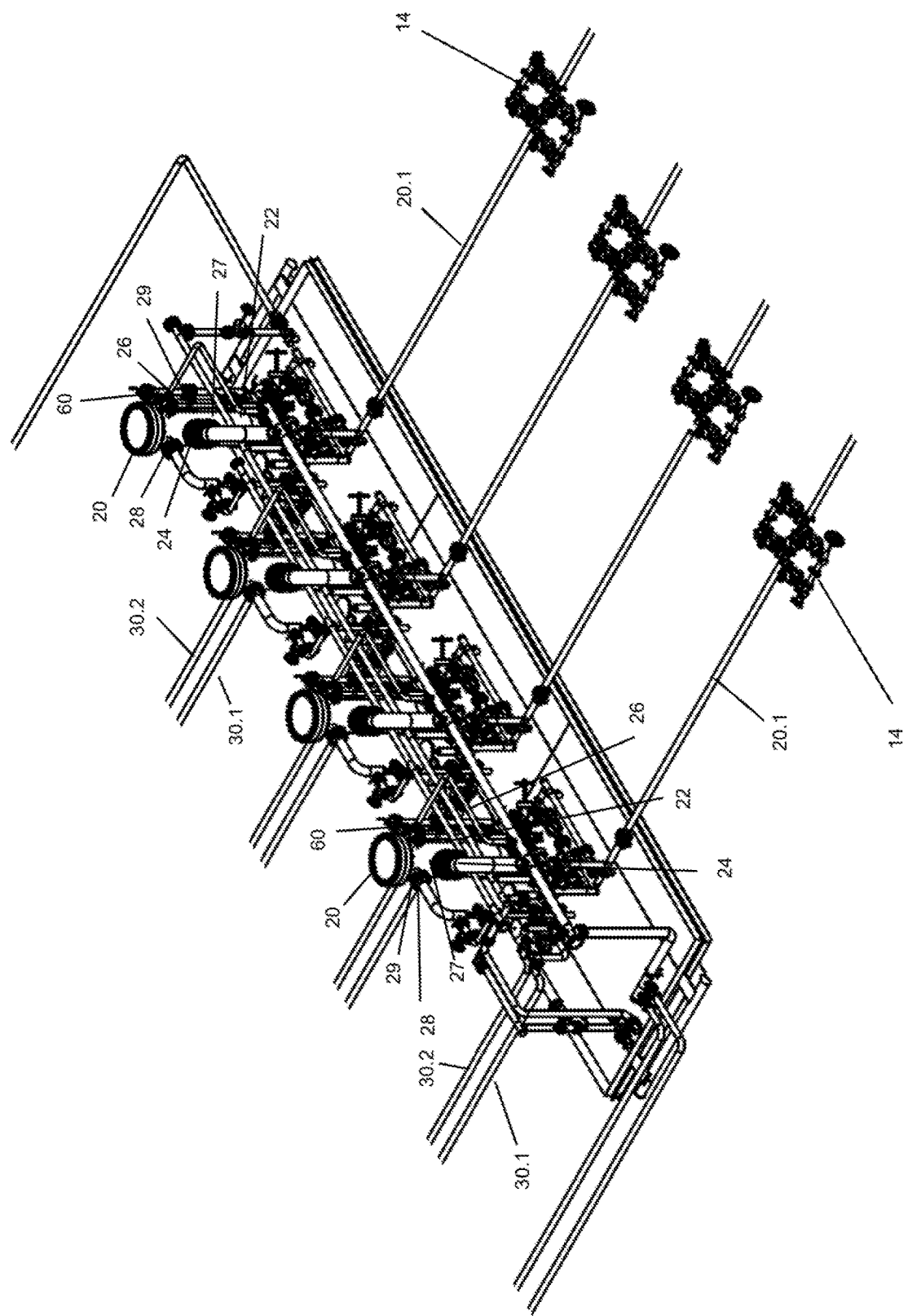
FIG. 3B is an isolated schematic view of the first stage separators, according to the embodiment in FIG. 3A.
Figure 3C:
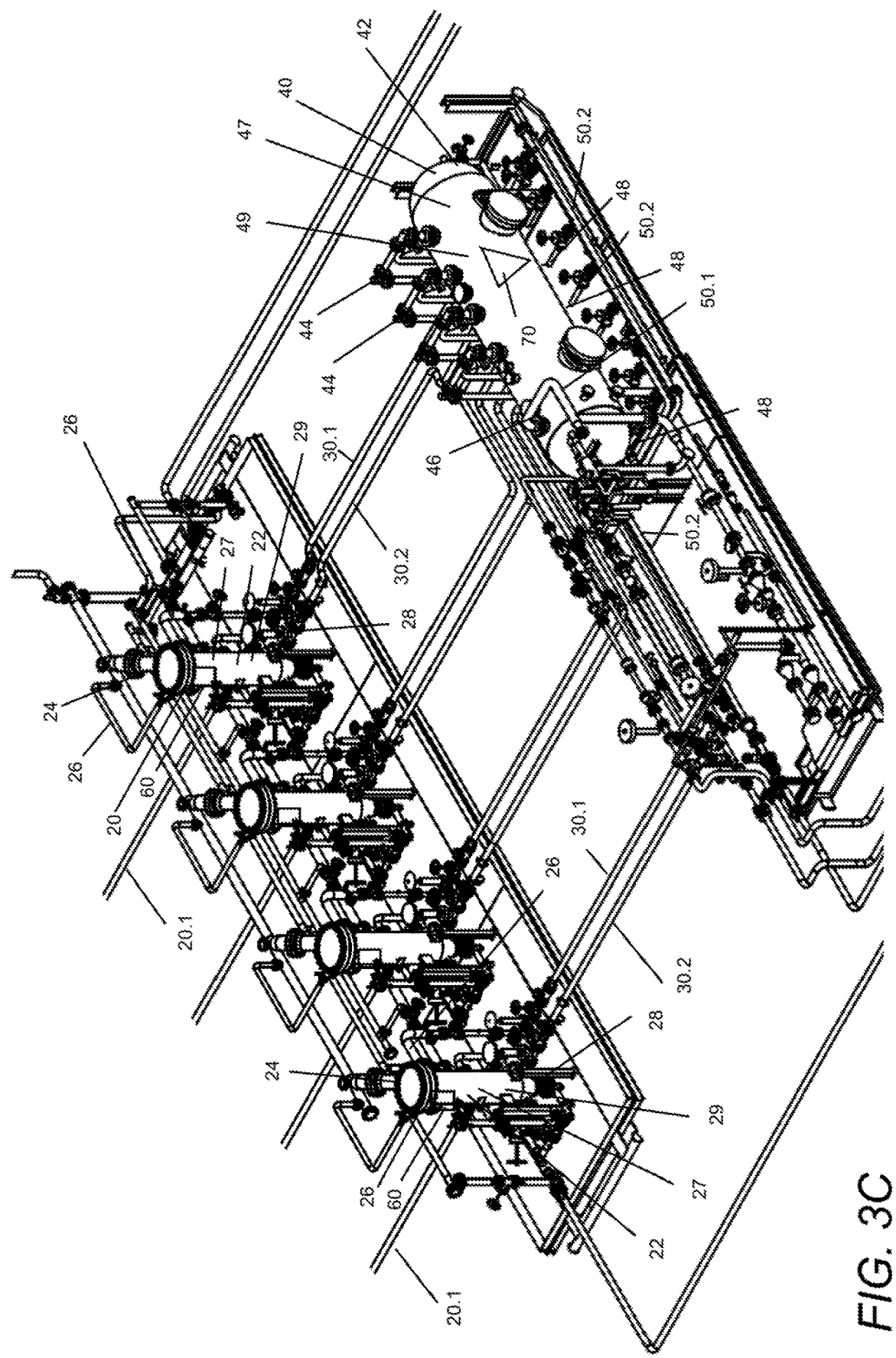
FIG. 3C is an isolated schematic view of the first stage separators and the second stage separator, according to the embodiment in FIG. 3A.
Figure 3D:
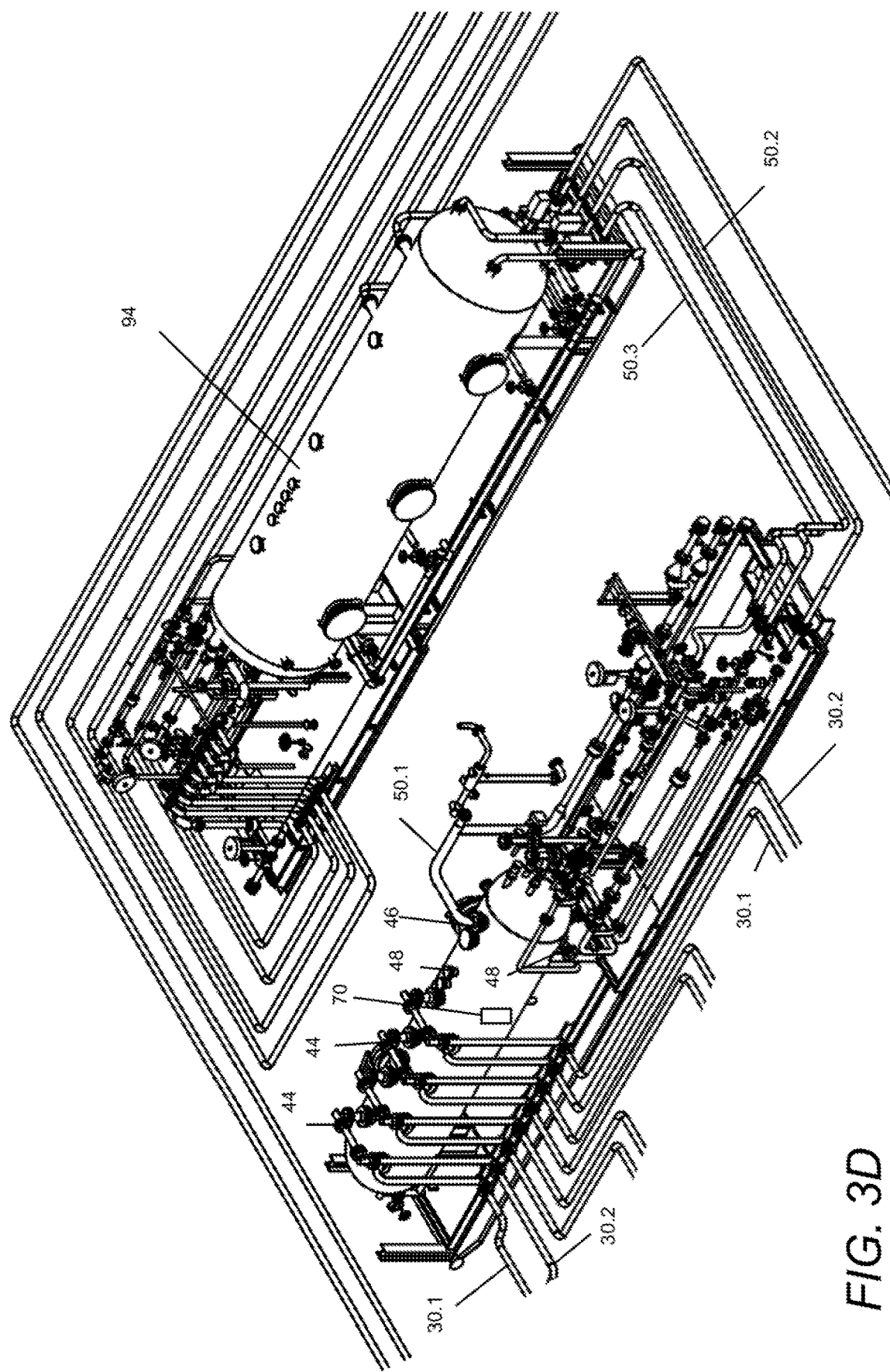
FIG. 3D is an isolated schematic view of the second stage separator and means for liquid storage, according to the embodiment in FIG. 3A.
Figure 4:
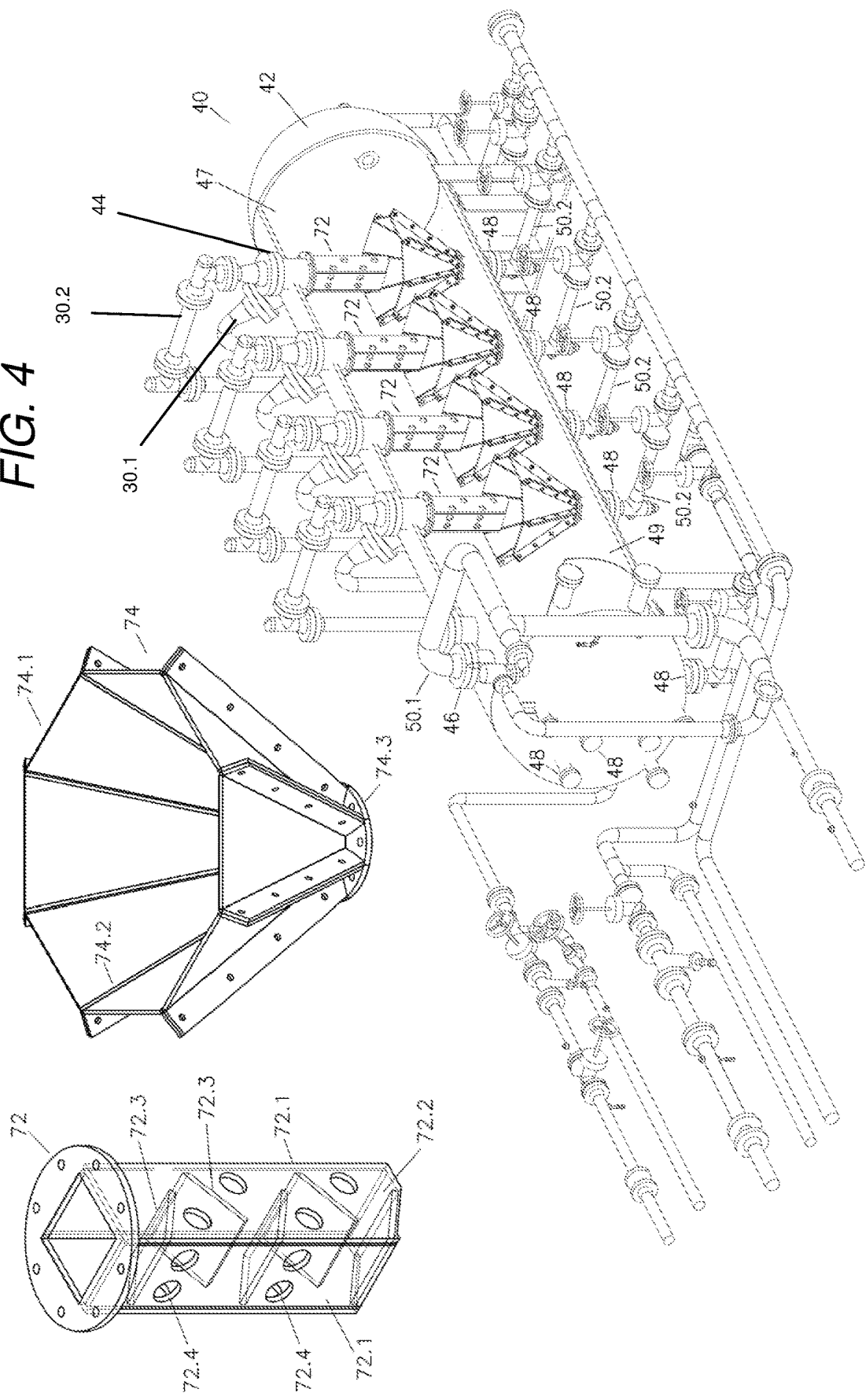
FIG. 4 shows schematic views of a first embodiment of the means for solids separation for the system and method for flowback fluid, according to the present invention.
Figure 5:
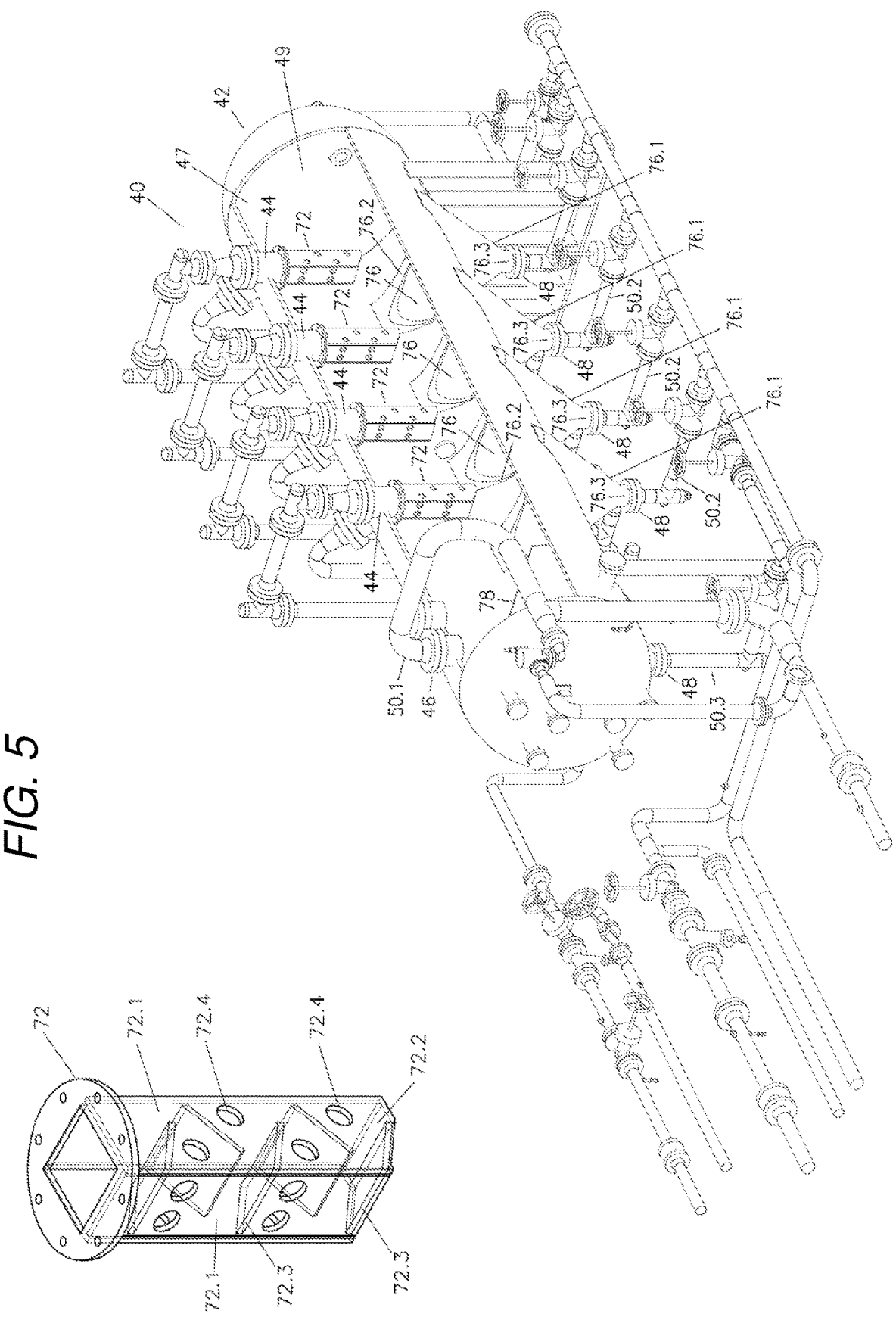
FIG. 5 shows schematic views of a second embodiment of the means for solids separation for the system and method for flowback fluid, according to the present invention.

FIGS. 4-5 show embodiments of the second stage separator 40 for both embodiments of FIGS. 2, 3A, 3B, 3C and 3D and FIGS. 6, 7A, 7B, and 7C. The second stage tank 42 has a second stage volume 47 with a second stage gas capacity 49. The second stage tank 42 is smaller than the prior art vessels in prior art horizontal separators. However, the first stage volume 27 is less than the second stage volume 47. The relationship between the first stage tank 22 and the second stage tank 42 is that the second stage gas capacity 49 now decreases when the first release gas phase 30.1 of the flowback fluid flow 20.1 (FIG. 2) or diversion flowback fluid 142.1 (FIG. 6) passes through the primary first stage outlet 26, when the first de-gassed flowback fluid flow 30.2 passes through the secondary first stage outlet 28 to the second stage volume 47, and when a second release gas phase 50.1 of the first de-gassed flowback fluid flow 30.2 passes through the primary second stage outlet 46. The system 10 and method of the present invention sever the different processes of the prior art horizontal separator into different steps, sequences, and components. The components have different relative sizes and capacities to set the relationship between these components. The system 10 is no longer limited to the retention time in a large vessel. The first release gas phase 30.1 is already separated from the flowback fluid flow 20.1. In the embodiments with the first release gas phase 30.1 passing through another primary first stage outlet 26 to the second stage inlet 44, the pre-separation affects efficiency of the additional phase separations in the second stage tank 40. The first release gas phase 30.1 is not mixed back into the first de-gassed flowback fluid flow 30.2. The second stage tank 42 passes the second release gas phase 50.1 through the primary second stage outlet 46, even as the gas capacity 49 decreases by the solids retention in the second stage tank 42. The first and second gas releases 30.1 and 50.1 set the first stage tank 22 relatively smaller and with a first stage gas capacity 29 as constant so that the second stage tank 42 can be larger and with a decreasing second stage gas capacity 49.

The embodiments of both FIGS. 2, 3A, 3B, 3C and 3D and FIGS. 6, 7A, 7B, and 7C also show the system 10 with a plurality of metering devices 60. Each metering device 60 is in fluid connection with a respective first stage separator 20 and the second stage separator 40. There is a metering device 60 for flowback fluid flow 20.1 from each wellhead 12 in FIGS. 2, 3A, 3B, 3C and 3D. Each metering device 60 connects to a respective primary first stage outlet 26 and a respective secondary first stage outlet 28 so that the first release gas phase 30.1 and the first de-gassed flowback fluid 30.2 from each wellhead 12 can be measured. Individual wellheads 12 can now be assessed and evaluated for efficiency and performance. A low performing wellhead can no longer avoid detection in the mixed flowback fluids to a single horizontal separator. The metering device 60 may also connect to a corresponding second stage inlet 44 of the second stage separator 40 as the first de-gassed flowback fluid 30.2 passes through the system 10.

Embodiments of the system 10 include each metering device 60 being positioned at least between a respective wellhead 12 and the second stage separator 40. FIGS. 2, 3A, 3B, 3C and 3D show each metering device 60 is positioned between a respective first stage separator 20 and the second stage separator 40. The metering device 60 measures the first release gas phase 30.1 and the first de-gassed flowback fluid 30.2 from each wellhead 12 after the first separation. In particular, the metering device 60 can be positioned within a respective secondary first stage outlet 28 and corresponding second stage inlet 44 of said second stage separator.

The alternate embodiments of FIGS. 6, 7A, 7B, and 7C include the same metering devices 60; however, there is a metering device 60 for diversion flowback fluid flow 142.1 from each diversion outlet 142, instead of flowback fluid flow 20.1 from each wellhead 12. Each metering device 60 connects to a respective primary first stage outlet 26 and a respective secondary first stage outlet 28 so that the first release gas phase 30.1 and the first de-gassed flowback fluid 30.2 from each diversion outlet 142 can be measured. Individual diversion outlets 142 can now be assessed and evaluated for efficiency and performance. The metering device 60 may still connect to a corresponding second stage inlet 44 of the second stage separator 40 as the first de-gassed flowback fluid 30.2 passes through the system 10.

Embodiments of the system 10 of FIGS. 6, 7A, 7B, and 7C still include each metering device 60 being positioned at least between a respective wellhead 12 and the second stage separator 40. FIGS. 6, 7A, 7B, and 7C show each metering device 60 is positioned between a respective first stage separator 20 and the second stage separator 40. The metering device 60 measures the first release gas phase 30.1 and the first de-gassed flowback fluid 30.2 from each diversion outlet 142 after the first separation. In particular, the metering device 60 can be positioned within a respective secondary first stage outlet 28 and corresponding second stage inlet 44 of said second stage separator.

With controller 130 of the embodiments of FIGS. 6, 7A, 7B, and 7C, a single wellhead 12.9 is in fluid connection with a single first stage separator 20.9 through a single choke manifold 120.9 and a single diversion outlet 142.8 (FIG. 7C) with a single diversion flowback fluid flow 142.9. The first stage separator 20 with a respective metering device 60 associated with the single diversion outlet 142.8 become the single first stage separator 20.9 with a respective metering device 60.9 in FIGS. 7B and 7C. The single wellhead 12.9 has a single flowback fluid flow 20.1 isolated as single diversion flowback fluid flow 142.9 from the flowback fluid flow 20.1 corresponding to the remaining wellheads 12. In this relationship between the manifold skid 100 and the first stage separator 20, the single wellhead 12.9 can be assessed and evaluated for efficiency and performance as the single flowback fluid flow 20.9 became single diversion flowback fluid 142.9. A low performing wellhead can no longer avoid detection in the mixed flowback fluids to a single horizontal separator in this embodiment of FIGS. 6, 7A, 7B, and 7C.

The remaining wellheads 12 are in fluid connection with remaining first stage separators 20 through remaining choke manifolds 120 and remaining diversion outlets 142 of the diversion header 140. So, the system 10 of FIGS. 6, 7A, 7B, and 7C can proceed without any disruption as one particular wellhead 12 is evaluated. Furthermore, each wellhead 12 of the plurality of wellheads 12 can alternate between being the single wellhead 12.9 with corresponding designation of the single flowback fluid 20.9, single choke manifold 120.9, single controller 130.9, single diversion outlet 142.8, single diversion flowback fluid flow 142.9, and single metering device 60.9 and being one of the remaining wellheads 12. Consequently, each choke manifold 120 of the plurality of choke manifolds 120 can alternate between being the single choke manifold 120.9 and being one of the remaining choke manifolds 120 in coordination with a respective wellhead 12 being evaluated. Similarly, each diversion outlet 142 can alternate between being the single diversion outlet 142.8 and being one of the remaining diversion outlets 142 with the corresponding single diversion flowback fluid flow 142.9 and remaining diversion flowback fluid flow 142.1. Each first stage separator 20 respectively alternates between being the single first stage separator 20.9 and being one of the remaining first stage separators 20 in coordination with a respective diversion outlet 142.

The system 10 can even continuously cycle through the wellheads 12 so that the flowback fluid flows 20.1 are consistently monitored. The controller 130 can set the diversion flowback fluid flows 142 with temperature, pressure, and flow rate considerations. The system 10 is no longer subject to whatever comes out of the wellhead. The system 10 of FIGS. 6, 7A, 7B, and 7C has improved safety and control beyond the single choke manifold 14 of FIG. 2.

An embodiment of the controller 130 is also shown in FIG. 7C. The controller 130 can be comprised of a plurality of valves 132 and an operator 134. The operator 134 can be a manual switch, actuator, key, lug, or an automated electronic processor, such as a programmable system. The operator 134 regulates the opening and closing of the valves 132 and is in communication with the valves 132. Other components, besides valves, such as pumps, can be used to regular the release of flowback fluid 20.1 into the diversion header 140 to be released as diversion flowback fluid 142.1.

In FIG. 7C, each choke manifold 120 has a respective set of the plurality of valves 132, and each valve 132 of the set having a different connection to a section of the diversion header 140. The operator 134 opens and closes a combination of the valves 132 to connect a particular flowback fluid flow 20.1 to a particular diversion outlet 142 through the diversion header 140. For example, the valves 132 can be opened for the single choke manifold 120.9 to be in fluid connection with only the single diversion outlet 142.8 with corresponding single diversion flowback fluid flow 142.9, while the other choke manifolds 120 have valves 132 open to mix together into diversion flowback fluid flow 142.1 and to be in fluid connection with the remaining diversion outlets 142.

In both embodiments of FIGS. 2, 3A, 3B, 3C and 3D and FIGS. 6, 7A, 7B, and 7C, from the second stage tank 42, the second release gas phase 50.1 can be collected. This gas phase may also be suitable for the sales line, as the commodity produced from the wellhead, similar to the first release gas phase 30.1. The second release gas phase 50.1 may have taken longer to release from the flowback fluid 20.1 or the diversion flowback fluid 142.1 or the first de-gassed flowback fluid 30.2. This gas phase may also be stored or disposed, depending upon quality and other factors. In some embodiments, the second stage separator 40 can include a second means for gas phase separation 52 between the second stage tank 42 and at least one primary second stage outlet 46. The means for gas phase separation include demisters, mesh, fiber, and cyclones, which allow gas to pass with lesser moisture or fewer particles. The second release gas phase 50.1 can also be monitored for temperature, pressure, flow rate and purity so as to determine usefulness and value.

The embodiments of the system 10 and method for processing flowback fluid, according to FIGS. 2, 3A, 3B, 3C and 3D and FIGS. 6, 7A, 7B, and 7C can also include the second stage separator 40 having a means for solids separation 70 between the second stage tank 44 and at least one secondary second stage outlet 48. The means for solids separation 70 can include an interior cone, baffle, hopper, or an external cone. A release solids phase 50.2 of the de-gassed flowback fluid flow 30.2 passes through the secondary second stage outlet 48 of the second stage tank 42. Mostly solids are removed and no longer require space in the second stage volume 47 or second stage gas capacity 49. FIGS. 2 and 6 show the means for solids removal 92. This embodiment allows the system 10 to control the amount of decreasing second stage gas capacity 49 such that the second stage gas capacity 49 can be maintained at a pre-determined amount. The amount is not a passive constant achieved by equilibrium because equilibrium would never be reached in a system 10 with actual flowback fluid 20.1. The system 10 already reduces retention time and storage capacity by removing the first release gas phase 30.1 first. The means for solids separation 70 no longer relies solely on gravity, weight, and time to separate the solids, and these solids can be removed so that the release solids phase 50.2 can set the second stage gas capacity 49, when the first release gas phase 30.1 of the flowback fluid flow 20.1 (FIG. 2) or the diversion flowback fluid 142.1 (FIG. 6) passes through the primary first stage outlet 26, when the first de-gassed flowback fluid flow 30.2 passes through the secondary first stage outlet 28 to the second stage volume 47, and when the second release gas phase 50.1 of the first de-gassed flowback fluid flow 30.2 passes through the primary second stage outlet 46.

Additionally, FIGS. 3A and 7A show the embodiments with the means for solids separation 70 with at least another secondary stage outlet 48 passing a liquid flowback fluid flow 50.3 from the first de-gassed flowback fluid flow 30.2. Again, removing this liquid flowback fluid flow 50.3 further sets the second stage gas capacity 49 at the pre-determined amount. The means for fluid storage 94 are shown in FIGS. 3A and 7A. It is also possible to be both the means for solids removal 92 and the means for fluid storage 94 in the systems 10 of either embodiment of FIGS. 2, 3A, 3B, 3C and 3D and FIGS. 6, 7A, 7B, and 7C. FIG. 3D shows the release solids phase 50.2 and the liquid flow back fluid flow 50.3 passing to a settling tank as the means for fluid storage 94 with solids removal.

FIGS. 4-5 show embodiments of the means for solid phase separation 70 compatible with both embodiments of FIGS. 2, 3A, 3B, 3C and 3D and FIGS. 6, 7A, 7B, and 7C. FIG. 4 shows the means for solid phase separation comprised of an inlet baffle assembly 72 and a cone assembly 74. The inlet baffle assembly 72 connects to a respective second stage inlet 44. The first de-gassed flowback fluid flow 30.2 passes through the inlet baffle assembly 72. The inlet baffle assembly 72 is comprised of a plurality of wall members 72.1 forming a wall enclosure 72.2, and a plurality of baffle plates 72.3 mounted within the wall enclosure 72.2. At least one wall member 72.1 has a hole 72.4. When the first de-gassed flowback fluid flow 30.2 passes through the second stage inlet 44, the first de-gassed flowback fluid flow 30.2 fills to the wall enclosure 72.2 and eventually through the wall enclosure 72.2 or the hole 72.4 or holes, affecting flow speed and facilitating separation of the solids as a filter. The second stage inlet 44 remains in fluid connection with the second stage tank 42 through the hole 72.4 or holes.

The cone assembly 74 is positioned beneath the respective inlet baffle assembly 72 so that the first de-gassed flowback fluid flow 30.2 falls into the cone assembly 74 from the inlet baffle assembly 72.

FIG. 4 shows a first embodiment of the cone assembly 74 as an internal structure within the second stage volume 47. The cone assembly 74 of this embodiment is comprised of a cone body 74.1 having a top opening 74.2 and a bottom opening 74.3 smaller than the top opening 74.2. FIG. 4 shows cone assemblies 74 for each second stage inlet 44. Each cone body 74.1 has a means for attaching the cone body to the second stage tank 42, such as bolts, welds, and screws. The cone body 74.1 is positioned within the second stage tank 42. The bottom opening 74.3 is in fluid connection with at least one of the secondary second stage outlets 48. The release solids phase 50.2 passes through the bottom opening 74.3 to the respective secondary second stage outlet 48. The solids are maintained in the cone body 74.1 such that the liquid flowback fluid flow 50.3 spills over the cone body 74.1 and fills the second stage tank 42. The liquid flowback fluid flow 50.3 can settle in the second stage tank 42 and separate as the amount increases. The liquid flowback fluid flow 50.3 then passes to another secondary second stage outlet for removing the liquid flowback fluid flow 50.3 from the second stage separator 40. The inlet baffle assembly 72 and cone assembly 74 affect flow rate and retention time so that the storage capacity of the second stage tank 42 is no longer a limiting factor of the system 10.

In the embodiment of FIG. 4, the method further includes settling the release solids phase 50.2 at the bottom opening 74.3 of the cone assembly 74. The cone body 74.1 is angled and slides the solids down the surface more quickly to the bottom. The retention time is further reduced because the most concentrated solids reach the smaller bottom opening 74.3 for separation and removal first. Gravity and weight are no longer the only passive forces on the solids. The release solids phase 50.2 then passes through the bottom opening 74.3 to a means for solids removal 92, such as a storage vessel, solids line, or settling tank, connected to the at least one secondary second stage outlet 48.

FIG. 5 shows a second embodiment of the cone assembly 76 as a protruding structure from beneath the second stage tank 42. In this second embodiment, the cone assembly 76 is comprised of a cone protrusion 76.1 having an upper opening 76.2 and a lower opening 76.3 smaller than the upper opening 76.2. The cone protrusion 76.1 is made integral with the second stage tank 42. The upper opening 76.2 is in fluid connection with the second stage tank 42 such that the first de-gassed flowback fluid flow 30.2 passes from the inlet baffle assembly 72 to the cone protrusion 76.1 through the upper opening 76.2. The cone protrusion 76.1 extends below the second stage tank 42 such that the lower opening 76.3 is beneath the second stage tank 42. The lower opening 76.3 is in fluid connection with the at least one of the secondary second stage outlets 48 for the release solids phase 50.2. FIG. 5 also shows a Weir plate 78 between the cone protrusion 76.1 and at least another secondary second stage outlet 48. The Weir plate 78 in this embodiment functions again to allow the liquid flowback fluid flow 50.3 to separate in the second stage tank 42. As the solids pass below the second stage tank 42, the liquid remains in the second stage tank 42. The liquid flowback liquid flow 50.3 can now separate with the lighter oil portion spilling over the Weir plate 78 and eventually rising to another secondary second stage outlet 48 on this side of the Weir plate 78. The liquid flowback fluid flow 50.3 then passes to the other secondary second stage outlet 48 for removing the liquid flowback fluid flow 50.3 from the second stage separator 40. The inlet baffle assembly 72 and cone assembly 76 affect flow rate and retention time so that the storage capacity of the second stage tank 42 is no longer a limiting factor of the system 10.

In the embodiment of FIG. 5, the method further includes settling the release solids phase 50.2 at the lower opening 76.3 of the cone assembly 76. The cone protrusion 76.1 is angled and slides the solids down the surface more quickly to the bottom, similar to the cone body 74.1. The retention time is also further reduced because the most concentrated solids reach the smaller lower opening 76.3 for separation and removal first. Gravity and weight are no longer the only passive forces on the solids. The release solids phase 50.2 then passes through the lower opening 76.3 to a means for solids removal 92, such as a storage vessel, solids line, or settling tank, connected to the at least one secondary second stage outlet 48.

In both embodiments of FIGS. 4 and 5, the method can further control the pre-determined amount of the second stage gas capacity with the release solids phase 50.2 and the liquid flowback fluid flow 50.3. With the liquid flowback fluid flow 50.3 passing through the second stage tank 42 and at least another secondary second stage outlet 48, and with the at least another secondary second stage outlet 48 being positioned in the second stage tank 42 on a side of the Weir plate 78 opposite the cone assembly 76 in FIG. 5 or outside of the cone body 74.1 in FIG. 4, the second stage gas capacity 49 is maintained at the pre-determined amount.

FIGS. 3A and 7A show the embodiments of the system 10 as full installations at a site. There is a means for collecting the first release gas phase 90 connected to each primary first stage outlet 26. This means for collecting can be a sales line or a storage vessel. Similarly, there is a means for collecting the second release gas phase 90.1 connected to a corresponding primary second stage outlet 46. This means for collecting can also be a sales line or storage vessel, and in some embodiments, the same sales line or storage vessel will be collecting both the first release gas phase 30.1 and the second release gas phase 50.1. FIGS. 3A and 7A show the means for collecting the first release gas phase 90 as the same storage tank as the means for collecting the second release gas phase 90.1. In the embodiments with the means for solids separation 70, there is a means for solids removal 92 connected to the at least one secondary second stage outlet 48 connected to the means for solids separation 70. FIGS. 2 and 6 show the means for solids removal as a storage vessel, but the means for solids removal may also be a solids line or settling tank for the release solids phase 50.2. FIGS. 3A and 7A also show a means for fluid storage 94 for the liquid flowback fluid flow 50.3 connected to the at least another secondary second stage outlet 48. Pipes or lines also connect to a storage vessel or settling tank as the means for fluid storage 94. The full installations of FIGS. 3A and 7A include a means for gas disposal 96 in fluid connection with the means for collecting the first release gas phase 90 and the means for collecting the second release gas phase 90.1. The means for gas disposal 96 includes a vent, burn off tower, or a storage tank for transport off-site. FIGS. 3A and 7A show the burn off tower with the flame at the top.

The method for processing flowback fluid 20.1 of the present invention is shown in FIGS. 2, 3A, 3B, 3C and 3D. A flowback fluid flow 20.1 is produced from each wellhead 12 of a plurality of wellheads 12. The flowback fluid flow 20.1 passes through a choke manifold 14 to a system 10 comprised of a plurality of first stage separators 20, a second stage separator 40, and a plurality of metering devices 60. The method includes passing a first release gas phase 30.1 of the flowback fluid flow 20.1 through the primary first stage outlet 26 and passing a first de-gassed flowback fluid flow 30.2 through the secondary first stage outlet 28 to the second stage volume 47 so as to hold the first stage gas capacity 29 constant. There is no retention time in the first stage separators 20, so the first release gas phase 30.1 is the easiest to separate from the flowback fluid 20.1.

The method for processing flowback fluid 20.1 of the present invention with the manifold skid 100 is shown in FIGS. 6, 7A, 7B, and 7C. A flowback fluid flow 20.1 is produced from each wellhead 12 of a plurality of wellheads 12. The flowback fluid flow 20.1 passes to a system 10 comprised of a manifold skid 100 with a plurality of choke manifolds 120 and a diversion header 140, plurality of first stage separators 20, a second stage separator 40, and a plurality of metering devices 60. The method includes passing each flowback fluid flow 20.1 from each wellhead 12 to a corresponding choke manifold 120 of the manifold skid 100. The manifold skid 100 distributes each flowback fluid 20.1 to the diversion outlets 142 of the diversion header 140, according to the controller 130. The first separators 120 receive diversion flowback fluid 142.1 from a respective diversion outlet 142. A first release gas phase 30.1 of the diversion flowback fluid flow 142.1 passes through any primary first stage outlet 26, and a first de-gassed flowback fluid flow 30.2 passes through the secondary first stage outlet 28 to the second stage volume 47 so as to hold the first stage gas capacity 29 constant. There is no retention time in the first stage separators 20, so the first release gas phase 30.1 is the easiest to separate from the diversion flowback fluid 142.1.

The first release gas phase 30.1 separates, as a first de-gassed flowback fluid flow 30.2 passes to the second separator 40 through the secondary first stage outlet 28 and the second stage inlet 44 to the second stage volume 47. The first release gas phase 30.1 may also pass through another primary first stage outlet 26 and the second stage inlet 44 to the second stage volume 47 separate from the first de-gassed flowback fluid flow 30.2. A second release gas phase 50.1 of the first de-gassed flowback fluid flow 30.2 passes through the primary second stage outlet 46. With the first release gas phase 30.1 and the second release gas phase 50.1 leaving the flowback fluid flow 20.1 or diversion flowback fluid 142.1 in the alternate embodiment, the second stage gas capacity 49 decreases, unlike the constant first stage gas capacity 29. Now, the retention time in the second stage tank 42 is less than the prior art and controlled, even as the solids settle to decrease the second stage gas capacity 49. Furthermore, the embodiment of FIGS. 6 and 7A can control for pressure, temperature, and flow rate of the diversion flowback fluid 142.1 for improved safety conditions and efficient separation throughout the system 10.

The present invention further includes measuring the first release gas phase 30.1 at any primary first stage outlet 26 with a respective metering device 60 and measuring the first de-gassed flowback fluid flow 30.2 at the secondary first stage outlet 28 with the respective metering device 60. The respective metering device 60 provides data to evaluate the corresponding wellhead 12 connected to that first stage separator 20. Individual wellheads 12 can now be accurately assessed for production efficiency, not just production, and the measurements are taken before the individual flowback fluids 20.1 are mixed in the second stage separator 40.

The method of the present invention can also include designating a single wellhead 12.9 in FIGS. 6, 7A, 7B, and 7C. When the controller 130 distributes a single flowback fluid 20.9 of the single wellhead 12.9 to a single choke manifold 120.9, a single controller 130.9, a single diversion outlet 142.8 with a single diversion flowback fluid flow 142.9 and single first stage separator 120.9, the corresponding metering device 60.9 measures the single wellhead 12.9. Thus, an individual wellhead 12.9 can also be evaluated in the embodiment of FIGS. 6, 7A, and 7C. The remaining wellheads 12 continue to produce flowback fluid 20.1, which is still mixed and distributed by the diversion header 140 and remaining diversion outlets 12 to the remaining first stage separators 20. The method of FIGS. 6 and 7A can isolate a single wellhead 12.9 for evaluation.

Furthermore, the embodiment of FIGS. 6 and 7A can include alternating the designation of the single wellhead 12.9 with each of the remaining wellheads 12 so that each wellhead 12 can have a turn at being evaluated. The controller 130 of the manifold skid 100 can direct a cycle or cascade of alternating each wellhead and the corresponding each choke manifold. Thus, each diversion outlet and corresponding each first stage separator can be similarly cycled or cascaded. This system 10 of FIGS. 6 and 7A allows for consistent diversion flowback fluid 142.1 to be passed to the first stage separators 20. The characteristics of the flowback fluid 20.1 from each wellhead 12 can be recorded and projected so that the mixture with the remaining wellheads 12 can be distributed with predictable or even consistent temperature, pressure, and flow rate to diversion outlets 142.

When the controller 130 is comprised of a plurality of valves 132 and a operator 134, the method of this embodiment includes actuating each valve 132 according to the operator 134 to open or close in the combination corresponding to passing flowback fluid 20.1 to the diversion header 140 and a particular diversion outlet 142 or group of diversion outlets 142 determined by the operator 134. Each choke manifold 120 can have a set of valves 132, such that different combinations of opening and closing thee set of valves 132 corresponds to different connections to the diversion header 140. The operator 134 controls each diversion outlet 142 so as to pass a set diversion flowback fluid 142.1 from each diversion outlet 142. The operator 134 opens and closes a combination of the valves 132 to connect a particular flowback fluid flow 20.1 to a particular diversion outlet 142 through the diversion header 140.

The first release gas phase 30.1 and the second release gas phase 50.1 can be collected as the valuable commodity produced from the wellhead 12. These gas phases can be stored in tanks for later use or transport. These gas phases may also be disposed, such as storage for destruction, venting or being burned off.

In embodiments of the method of the present invention with the means for solids separation 70, such as a cone or hopper, the method further includes passing a release solids phase 50.2 of the de-gassed flowback fluid flow 30.2 through the secondary second stage outlet 48. The solids are removed to further set the second stage gas capacity 49 at a pre-determined amount. The amount of decreasing when the first release gas phase 30.1 of the flowback fluid flow 20.1 passes through the primary first stage outlet 26 and when the first de-gassed flowback fluid flow 30.2 passes through the secondary first stage outlet 28 to the second stage volume 47 is now balanced by the removal of the solids. The amount of decreasing the second stage gas capacity 49 can now be adjusted for more or less retention time. The second stage gas capacity 49 can be set at a pre-determined amount to be increasing, decreasing less, or being held constant. The method is no longer a passive exercise depending on clogs and unpredictable solids buildup in the second stage tank 42. The method further includes collecting the release solids phase 50.2 from the second stage separator, and storing the release solids phase separate from the second stage tank 42 of the second stage separator. The solids no longer collect in the volume of the vessel. The storage capacity is not always decreasing and not always decreasing without any control. Solids removal at this stage and sequence with the components of the present invention affect efficiency and control. Improved safety conditions are also a result of the control over the flowback fluids 20.1. The method further includes passing the liquid flowback fluid flow 50.3 through the second stage tank 42 and at least another secondary second stage outlet 48, different than the secondary second stage outlet 40 for the solids removal.

The system and method of the present invention improves processing flowback fluid. The prior art system was passive and inefficient. The previous technology in hydraulic fracturing addressed problem by increasing the size of horizontal separators or increasing the size and numbers of horizontal separators. The convenience of processing in a single separator prevented individual evaluation of wellheads and improving efficiency of different separation steps. The gas, oil, water, and solids separations were all happening in the same space and under the same conditions.

In the present invention, the metering devices in the context of the system and sequence in the method now allow for individual evaluation of a wellhead. A multiple wellhead installation can now assess the production and production efficiency, such as the amount of useful gas, of an individual wellhead.

Furthermore, there is now a multiple stage process for recovering gas and separating other phases from hydraulic fracturing. There is a sequence of steps and the relationships between the smaller components. The first stage separators and one second stage separator selectively sever the multiple processes of a conventional horizontal separator into isolated stages with corresponding components. The single volume for a single retention time in the prior art can be transformed into less retention time in smaller and cheaper equipment, while still maintaining the convenience of the second stage separator for all flowback fluids from all wellheads in the group. Furthermore, the independent temperature, pressure, flow rate, and retention time conditions in the corresponding components are set according to the associated isolated stage for more control. By dividing the separations, the retention time in a single volume is no longer the determinative and limiting factor in processing.

In embodiments with the manifold skid, the independent temperature, pressure, flow rate, and retention time conditions in the corresponding components can be set at pre-determined levels for improved safety and efficient control. Instead of processing flowback fluid in whatever conditions from the wellhead, the manifold skid can set those conditions at safer levels or more efficient levels, such as a slower flow rate to allow for separation of the solid phase before reaching the second stage tank. In this method, the retention time is reduced because less time is needed to settle in the second stage tank.

Embodiments further affect retention time with the means for separating the solid phase from the flowback fluid. The passive drains and the reliance on gravity or weight of the sand can be inefficient and dangerous. Overflows with volatile flowback fluids, with all kinds of additives and chemicals, were a constant hazard. In the present invention, the solids removal no longer has a storage capacity problem or strict reliance on gravity and weight. The particular means for separating the solid phase as the cone body or cone protrusion has the sloped surfaces to more quickly isolate the solids for removal. The flow rate of removing solids can stabilize and control the decrease in storage capacity or set a pre-determined amount of decrease, further modifying and controlling the retention time for effectiveness. When actively removed, the relationships between the first stage tank and second stage tank are affected to increase efficiency of the retention time in the smaller volumes, compared to the prior art. In the present invention, the selective separation sequence and isolation in different components greatly improves the processing of flowback fluids.

The foregoing disclosure and description of the invention is illustrative and explanatory thereof. Various changes in the details of the illustrated structures, construction and method can be made without departing from the true spirit of the invention.

I claim:

1. A system for processing flowback fluid, the system comprising:
    a plurality of wellheads, each wellhead producing a flowback fluid flow;
    a plurality of first stage separators, each first stage separator being in fluid connection to a respective wellhead, each first stage separator being comprised of a first stage tank with a first stage inlet, a primary first stage outlet, and a secondary first stage outlet, said first stage tank having a first stage volume with a first stage gas capacity;
    a second stage separator in fluid connection with said plurality of first stage separators, said second stage separator being comprised of a second stage tank with a plurality of second stage inlets, a plurality of primary second stage outlets, and a plurality of secondary second stage outlets, said second stage tank having a second stage volume with a second stage gas capacity; and
    a plurality of metering devices, each metering device being in fluid connection with a respective first stage separator and said second stage separator, each metering device connecting to a respective primary first stage outlet and a respective secondary first stage outlet connected to a corresponding second stage inlet of said second stage separator,
    wherein said first stage volume is less than said second stage volume,
    wherein said first stage gas capacity is held constant when a first release gas phase of said flowback fluid flow passes through said primary first stage outlet and when a first de-gassed flowback fluid flow passes through said secondary first stage outlet to said second stage volume, and
    wherein said second stage gas capacity decreases when said first release gas phase of said flowback fluid flow passes through said primary first stage outlet, when said first de-gassed flowback fluid flow passes through said secondary first stage outlet to said second stage volume, and when a second release gas phase of said first de-gassed flowback fluid flow passes through said primary second stage outlet.

2. The system for processing flowback fluid, according to claim 1, wherein at least one of said first stage separators is comprised of a gas liquid cylindrical cyclone separator.

3. The system for processing flowback fluid, according to claim 1, wherein each first stage separator further comprises a first means for gas phase separation between a respective first stage tank and a respective primary first stage outlet and a choke manifold between a respective wellhead and a respective first stage inlet.

4. The system for processing flowback fluid, according to claim 1, wherein said secondary first stage outlet and a respective second stage inlet form a bypass line, said first stage tank having said flowback fluid flow in fluid connection to said second stage tank.

5. The system for processing flowback fluid, according to claim 1, wherein said second stage separator further comprises a second means for gas phase separation between said second stage tank and at least one primary second stage outlet.

6. The system for processing flowback fluid, according to claim 1, further comprising a means for collecting said first release gas phase connected to each primary first stage outlet.

7. The system for processing flowback fluid, according to claim 1, further comprising a means for collecting said second release gas phase connected to a corresponding primary second stage outlet.

8. The system for processing flowback fluid, according to claim 1, wherein said means for collecting said first release gas phase is comprised of said means for collecting said second release gas phase.

9. The system for processing flowback fluid, according to claim 1, further comprising a means for solids removal connected to said at least one secondary second stage outlet.

10. The system for processing flowback fluid, according to claim 1, further comprising a means for fluid storage connected to said at least one secondary second stage outlet.

11. The system for processing flowback fluid, according to claim 8, further comprising a means for gas disposal in fluid connection with said means for collecting said first release gas phase and said means for collecting said second release gas phase.

12. A method for processing flowback fluid, the method comprising the steps of:
producing a flowback fluid flow from a plurality of wellheads;
passing said flowback fluid flow to a system comprised of a plurality of first stage separators, a second stage separator, and a plurality of metering devices,
wherein each first stage separator is in fluid connection to a respective wellhead, each first stage separator being comprised of a first stage tank with a first stage inlet, a primary first stage outlet, and a secondary first stage outlet, said first stage tank having a first stage volume with a first stage gas capacity,
wherein said second stage separator is in fluid connection with said plurality of first stage separators, said second stage separator being comprised of a second stage tank with a plurality of second stage inlets, a plurality of primary second stage outlets, and a plurality of secondary second stage outlets, said second stage tank having a second stage volume with a second stage gas capacity,
wherein each metering device is in fluid connection with a respective first stage separator and said second stage separator, each metering device connecting to a respective primary first stage outlet and a respective secondary first stage outlet connected to a corresponding second stage inlet of said second stage separator,
wherein said first stage volume is less than said second stage volume;
passing a first release gas phase of said flowback fluid flow through said primary first stage outlet and passing a first de-gassed flowback fluid flow through said secondary first stage outlet to said second stage volume so as to hold said first stage gas capacity constant;
passing a second release gas phase of said first de-gassed flowback fluid flow through said primary second stage outlet, when said first release gas phase of said flowback fluid flow passes through said primary first stage outlet and when said first de-gassed flowback fluid flow passes through said secondary first stage outlet to said second stage volume so as to decrease said second stage gas capacity;
measuring said first release gas phase at said primary first stage outlet with a respective metering device;
measuring said first de-gassed flowback fluid flow at said secondary first stage outlet with said respective metering device;
collecting said first release gas phase; and
collecting said second release gas phase.

13. The method for processing flowback fluid, according to claim 12, wherein the step of passing said first release gas phase of said flowback fluid flow through said primary first stage outlet further comprises the step of:
passing said first release gas phase of said flowback fluid flow through another primary first stage outlet to said second stage separator.

14. The method for processing flowback fluid, according to claim 12, further comprising the steps of:
storing at least one of a group consisting of said first release gas phase and said second release gas phase.

15. The method for processing flowback fluid, according to claim 12, further comprising the steps of:
disposing of at least one of a group consisting of said first release gas phase and said second release gas phase.

16. The method for processing flowback fluid, according to claim 12, wherein said second stage separator further comprises a means for solids separation between said second stage tank and at least one secondary second stage outlet, the method further comprising:
passing a release solids phase of said de-gassed flowback fluid flow passes through said secondary second stage outlet, when said first release gas phase of said flowback fluid flow passes through said primary first stage outlet and when said first de-gassed flowback fluid flow passes through said secondary first stage outlet to said second stage volume so as to maintain said second stage gas capacity at a pre-determined amount.

17. The method for processing flowback fluid, according to claim 16,
collecting said release solids phase from said second stage tank of said second stage separator; and
storing said release solids phase collected from said second stage tank of said second stage separator.

18. The method for processing flowback fluid, according to claim 17,
passing a liquid flowback fluid flow through said second stage tank and at least another secondary second stage outlet.

* * * * *